United States Patent
Gumpoltsberger et al.

(10) Patent No.: US 8,365,624 B2
(45) Date of Patent: *Feb. 5, 2013

(54) DUAL CLUTCH TRANSMISSION

(75) Inventors: Gerhard Gumpoltsberger, Friedrichshafen (DE); Juergen Wafzig, Eriskirch (DE); Matthias Reisch, Ravensburg (DE); Wolfgang Rieger, Friedrichshafen (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 425 days.

This patent is subject to a terminal disclaimer.

(21) Appl. No.: 12/681,937

(22) PCT Filed: Oct. 8, 2008

(86) PCT No.: PCT/EP2008/063421
§ 371 (c)(1),
(2), (4) Date: Apr. 7, 2010

(87) PCT Pub. No.: WO2009/050070
PCT Pub. Date: Apr. 23, 2009

(65) Prior Publication Data
US 2010/0212441 A1  Aug. 26, 2010

(30) Foreign Application Priority Data
Oct. 15, 2007 (DE) .......... 10 2007 049 264

(51) Int. Cl.
*F16H 3/08* (2006.01)

(52) U.S. Cl. ...................................................... 74/330

(58) Field of Classification Search .......... 74/330, 74/333, 340
See application file for complete search history.

(56) References Cited

U.S. PATENT DOCUMENTS

| 6,244,123 | B1 | 6/2001 | Hegerath et al. | |
|---|---|---|---|---|
| 6,869,379 | B2 * | 3/2005 | Voss et al. | 475/218 |

(Continued)

FOREIGN PATENT DOCUMENTS

| DE | 38 22 330 A1 | 7/1989 |
|---|---|---|
| DE | 102 39 540 A1 | 3/2004 |

(Continued)

OTHER PUBLICATIONS

Prof. Dr. P. Tenberge; "Doppelkupplungsgetriebe in Planetenradbauweise Getriebestrukturen zwischen Automatik-und Doppelkupplungsgetrieben" Wissenportal baumaschine de 3 2007.

*Primary Examiner* — Ha D. Ho
(74) *Attorney, Agent, or Firm* — Davis & Bujold, PLLC (57) ABSTRACT

A dual clutch transmission having countershafts, idler gears and input shafts with gears which engage with the idler gears. The countershafts have a power take-off gear that is coupled to an output shaft. Shift elements connect gear wheels to engage forward and reverse gears. The transmission has two dual gear planes and two single gear planes, one idler gear of the countershafts being respectively associated with a fixed gear of one of the transmission input shafts in each of the dual gear planes. An idler gear in each dual gear plane is utilized for two gears and one idler gear of one countershafts associating with an input shaft fixed gear to shift at least one winding path gear via at least one shift element on each countershaft, and at least one winding path gear can be shifted with a coupling device associated with the take-off gear of the first countershaft and is disengaged.

22 Claims, 8 Drawing Sheets

U.S. PATENT DOCUMENTS

| | | | |
|---|---|---|---|
| 7,066,043 B2 * | 6/2006 | Kim et al. | 74/330 |
| 7,225,696 B2 * | 6/2007 | Gitt | 74/340 |
| 7,246,536 B2 | 7/2007 | Baldwin | |
| 7,287,442 B2 | 10/2007 | Gumpoltsberger | |
| 7,597,644 B2 * | 10/2009 | Rodgers, II | 475/218 |
| 7,604,561 B2 * | 10/2009 | Earhart | 475/218 |
| 7,604,565 B2 * | 10/2009 | Lee et al. | 477/3 |
| 8,051,732 B2 * | 11/2011 | Gitt | 74/331 |
| 2006/0054441 A1 | 3/2006 | Ruedle | |
| 2009/0036247 A1 * | 2/2009 | Earhart et al. | 475/35 |

FOREIGN PATENT DOCUMENTS

| | | |
|---|---|---|
| DE | 103 05 241 A1 | 9/2004 |
| DE | 10 2004 001 961 A1 | 8/2005 |
| DE | 10 2004 012 909 A1 | 10/2005 |
| DE | 10 2005 028 532 A1 | 12/2006 |
| DE | 10 2005 045 005 A1 | 3/2007 |
| FR | 2 880 088 A1 | 6/2006 |
| GB | 2 424 250 A | 9/2006 |
| WO | 2005/068875 A3 | 7/2005 |
| WO | 2005/093289 A1 | 10/2005 |

* cited by examiner

Fig. 1

| G | ZS | K1 | K2 | A | B | C | D | E | F | I | K | S_ab1 | S_ab2 |
|---|---|---|---|---|---|---|---|---|---|---|---|---|---|
| G1 | i_5·i_6·i_2 |  | 1 | 1 |  | 1 |  |  |  |  |  |  | 1 |
| G2 | i_2 | 1 |  |  |  |  |  |  | 1 |  |  | 1 | 1 |
| G3 | i_3 |  | 1 |  |  |  | 1 |  |  |  |  | 1 | 1 |
| G4 | i_4 | 1 |  |  |  |  |  | 1 |  |  |  | 1 | 1 |
| G5 | i_5 |  | 1 | 1 |  |  |  |  |  |  |  | 1 | 1 |
| G6 | i_6 | 1 |  |  |  | 1 |  |  |  |  |  | 1 | 1 |
| G7 | i_4·i_3·i_5 | 1 |  |  |  |  |  |  |  |  | 1 | 1 | 1 |
| R- GEAR | | | | | | | | | | | | | | |
| R1 | i_5·i_R·i_2 |  | 1 |  |  |  |  |  | 1 | 1 |  | 1 | 1 |
| CRAWLING GEAR | | | | | | | | | | | | | | |
| C1 | i_3·i_4·i_2 |  | 1 |  |  |  |  |  | 1 |  | 1 | 1 | 1 |
| FAST GEAR | | | | | | | | | | | | | | |
| O1 | i_3·i_2·i_6 |  | 1 |  |  |  | 1 |  | 1 |  | 1 |  | 1 |

| G | ZS | K1 | K2 | A | B | C | D | E | F | I | K | S_ab1 | S_ab2 |
|---|---|---|---|---|---|---|---|---|---|---|---|---|---|
| G1 | i_5·i_6·i_2 |  | 1 |  |  | 1 |  |  |  |  |  | 1 | 1 |
| G2 | i_2 | 1 |  |  |  | 1 |  |  |  |  |  | 1 | 1 |
| G3 | i_3 | 1 | 1 |  |  |  | 1 |  |  |  |  | 1 | 1 |
| G4 | i_4 |  | 1 |  |  |  |  |  | 1 | 1 |  | 1 | 1 |
| G5 | i_5 |  | 1 | 1 |  |  |  |  |  |  |  | 1 | 1 |
| G6 | i_6 | 1 |  |  | 1 |  |  |  |  |  |  | 1 | 1 |
| G7 | i_4·i_3·i_5 | 1 |  | 1 |  |  | 1 |  | 1 |  |  | 1 | 1 |
| R-GEAR | | | | | | | | | | | | | |
| R1 | i_3·i_R·i_2 |  | 1 |  |  | 1 |  |  |  | 1 | 1 | 1 | 1 |
| CRAWLING GEAR | | | | | | | | | | | | | |
| C1 | i_3·i_4·i_2 |  | 1 |  |  | 1 | 1 |  | 1 |  |  | 1 |  |
| FAST GEAR | | | | | | | | | | | | | |
| O1 | i_5·i_2·i_4 |  | 1 | 1 |  | 1 | 1 |  | 1 |  |  |  | 1 |

| G | ZS | K1 | K2 | A | B | C | D | E | F | I | K | S_ab2 |
|---|---|---|---|---|---|---|---|---|---|---|---|---|
| G1 | i_3·i_6·i_2 |  | 1 |  |  |  |  |  |  | 1 |  | 1 |
| G2 | i_2 | 1 |  |  |  | 1 |  |  |  |  |  | 1 |
| G3 | i_3 |  | 1 | 1 |  |  |  |  |  |  |  | 1 |
| G4 | i_4 | 1 |  |  |  |  |  |  | 1 |  |  | 1 |
| G5 | i_5 |  | 1 |  |  |  | 1 |  |  |  |  | 1 |
| G6 | i_6 | 1 |  |  | 1 |  |  |  |  |  |  | 1 |
| G7 | i_5·i_4·i_6 |  | 1 |  | 1 |  | 1 |  | 1 |  |  |  |

R- GEAR

| | | | | | | | | | | | | |
|---|---|---|---|---|---|---|---|---|---|---|---|---|
| R1 | i_5·i_R·i_2 |  |  |  |  | 1 |  |  |  |  | 1 |  |

FAST GEAR

| | | | | | | | | | | | | |
|---|---|---|---|---|---|---|---|---|---|---|---|---|
| O1 | i_6·i_3·i_5 | 1 |  |  |  |  | 1 |  |  | 1 |  | 1 |

| G | ZS | K1 | K2 | A | B | C | D | E | F | I | K | S_ab1 | S_ab2 |
|---|---|---|---|---|---|---|---|---|---|---|---|---|---|
| G1 | i_3·i_4·i_2 |  | 1 | 1 |  |  |  |  |  |  |  |  | 1 |
| G2 | i_2 | 1 |  |  |  | 1 |  |  | 1 |  |  | 1 | 1 |
| G3 | i_3 | 1 | 1 | 1 |  |  |  |  |  |  |  | 1 | 1 |
| G4 | i_4 |  | 1 |  |  | 1 |  |  |  |  |  | 1 | 1 |
| G5 | i_5 |  | 1 |  |  |  | 1 |  |  |  |  | 1 | 1 |
| G6 | i_6 | 1 |  |  | 1 |  |  |  |  |  |  | 1 | 1 |
| G7 | i_5·i_2·i_4 |  | 1 |  |  | 1 | 1 |  | 1 |  |  | 1 |  |

R-GEAR

| R1 | i_5·i_R·i_2 |  | 1 |  |  |  |  |  | 1 | 1 | 1 | 1 |  |

CRAWLING GEAR

| C1 | i_2·i_5·i_3 |  |  | 1 |  |  |  |  | 1 |  | 1 | 1 |  |

FAST GEAR

| O1 | i_6·i_3·i_5 |  |  |  |  | 1 | 1 |  | 1 | 1 |  | 1 | 1 |

Fig. 8

DUAL CLUTCH TRANSMISSION

This application is a National Stage completion of PCT/EP2008/063421 filed Oct. 8, 2008, which claims priority from German patent application serial no. 10 2007 049 264.4 filed Oct. 15, 2007.

FIELD OF THE INVENTION

The present invention relates to a dual clutch transmission for a vehicle.

BACKGROUND OF THE INVENTION

From the document DE 103 05 241 A1, a six- or seven-gear dual clutch transmission is known. The dual clutch transmission comprises two clutches, each of which is connected on their input sides to the input shaft and on their output sides to one of both transmission input shafts. Both of the transmission input shafts are arranged coaxially with respect to one another. Two countershafts are further arranged axially parallel to both transmission input shafts, and have idler gears that mesh with fixed gears of the transmission input shafts. Furthermore, the coupling devices are held rotationally fixed but axially shiftable to the countershafts in order to allow shifting of the particular gear wheels. The respectively selected gear ratio is transmitted to a differential gear by power take-off gears. In order to implement the desired transmission steps in the known dual clutch transmissions, a plurality of gear planes are required, such that a considerable amount of space is necessary for their installation.

A multistep spur gear transmission is further known from the published document DE 38 22 330 A1. The multistep spur gear transmission comprises a power-shifted dual clutch transmission, one part of which is connected to an input shaft and its other part is connected to a hollow input shaft that is rotatably mounted on the input shaft. For certain gear ratios, the input shaft can be coupled to the hollow input shaft via a shift element.

A power shift transmission with two clutches, each associated with a part transmission, is known from the published document DE 10 2004 001 961 A1. The transmission input shafts of both part transmissions are arranged coaxially with respect to one another and mesh with idler gears of the associated countershafts via fixed gears. The respective idler gears of the countershafts can be non-rotatably connected to the corresponding countershafts via associated shift elements. Among other things, a seven-speed transmission is known from the published document, and in which a further shift element is provided for coupling both transmission input shafts to implement another transmission step. In this embodiment, the seven-speed transmission requires at least six gear planes in both part transmissions to allow the transmission steps to be implemented. This results in an undesired extension of the overall length in the axial direction so that the possibilities of installing it in a vehicle are considerably limited.

SUMMARY OF THE INVENTION

The object of the present invention is to propose a dual clutch transmission of the type described above, with which power-shifted transmission steps are implemented as cost-effectively as possible with as few components as possible and with minimum installation space requirements.

Thus, a dual clutch transmission comprising two clutches with optimized installation space is proposed, whose input sides are connected to an input shaft and each of their output sides is connected to one of two transmission input shafts which are, for example, coaxially arranged with respect to one another. The dual clutch transmission comprises at least two countershafts, on which toothed gear wheels are rotatably mounted as idler gears, and gear wheels that are connected in a rotationally fixed manner on the transmission input shafts, and toothed gear wheels configured as fixed gears, which at least partially mesh with the idler gears. Furthermore, several coupling devices or the like are provided for connecting an idler gear in a rotationally fixed manner to a countershaft. The dual clutch transmission according to the present invention has a power take-off gear and/or constant pinion gear provided on the countershafts, each of which is coupled to the gearing of a input shaft in order to connect the respective countershaft to the output shaft, and at least one shift element or the like which can be activated and/or engaged, as a so called winding path gear shift element for a non-rotatable connection between two toothed gear wheels, wherein a plurality of power-shifted forward gears and at least one reverse gear can be shifted.

According to the present invention, the dual clutch transmission can preferably comprise only four gear planes, wherein at least one of the two power take-off gears is connected to the corresponding countershaft. In the dual clutch transmission, for example, two dual gear planes are provided, one idler gear of the first and second countershafts being associated with a fixed gear of one of the transmission input shafts in each dual gear plane, at least one idler gear in each dual gear plane being used for at least two gears, and, for example, two single gear planes being provided, in which one idler gear of the countershafts is associated with a fixed gear of one of the transmission input shafts, so that at least one winding path gear can be shifted via at least one shift element on each countershaft, and at least one winding path gear can be shifted with at least one coupling device that is associated with the power take-off gear of the first countershaft and opened. When the coupling device is disengaged, the respective power take-off gear can be detached from the associated countershaft, the associated coupling device being engaged when it is in the non-shifted and/or non-actuated state, so that the respective power take-off gear is connected in a rotationally fixed manner to the associated countershaft. Based on the multiple uses of idler gears, a maximum number of gear ratios can be implemented with as few gear planes as possible in the proposed dual clutch transmission, all forward gears and reverse gears being preferentially power-shiftable in a sequential manner.

By using two single gear planes instead of a dual gear plane, i.e. a fixed gear is replaced by two fixed gears, harmonic progressive gear stepping, in particular in the fourth, fifth, sixth and seventh gears, can be achieved with the dual clutch transmission according to the present invention. It is conceivable that the last or the next to last gear step is configured higher than the respectively previous one in order to provide a particularly high output torque and output power when downshifts are required by the driver. Further, a maximum of four shift elements per countershaft are used, which can be implemented, via shift elements and/or coupling devices, in order to possibly make do with a maximum of two actuating devices on each countershaft. In addition, in the dual clutch transmission according to the present invention, the last or the next to last gear step can be configured higher than the respectively previous one in order to provide a particularly high output torque and output power when downshifts are required by the driver. Further, the highest power-shifted gear can be configured as a winding path gear.

The proposed dual clutch transmission according to the present invention can preferably be configured as a 7-gear transmission. Due to the shortened design compared to known transmission arrangements, the dual clutch transmission according to the present invention is particularly suitable for front-transverse designs in vehicles. However, other designs are also possible, depending on the type and installation space situation of the vehicles under consideration in each case.

Within a possible embodiment of the invention, it can be provided that when the coupling device is disengaged, e.g. on the first countershaft, the power take-off gear is decoupled from the first countershaft, so that at least a first forward gear, or also other gears, can be shifted as a winding path gear. Moreover, an idler gear 8 of the second part transmission can be connected to an idler gear of the first part transmission via the shift element on the second countershaft w_v2, so that at least a seventh forward gear, or also other gears, can be shifted via the activated shift element. Furthermore, an idler gear of the second part transmission can be connected to an idler gear of the first part transmission via the other shift element on the first countershaft, so that at least one reverse gear can be shifted as a winding path gear via the activated shift element. It is possible that with the above embodiment, a crawling gear can additionally be shifted as a winding path gear via the activated shift element on the second countershaft.

According to another embodiment of the invention, it can be provided that an idler gear of the second part transmission can be connected to an idler gear of the first part transmission via the shift element on the first countershaft, so that at least one forward gear is shifted via the activated shift element. The power take-off gear on the second countershaft can further be decoupled from the second countershaft when the coupling device is disengaged, so that at least a seventh forward gear can be shifted as a winding path gear. Furthermore, an idler gear of the second part transmission can be connected to an idler gear of the first part transmission via the engaged shift element on the second countershaft, so that at least one first reverse gear or the like can be shifted as a winding path gear via the activated shift element. In the above embodiment, a crawling gear can additionally be shifted as a winding path gear on the second countershaft when the coupling device is disengaged. Other applications and connections are also possible.

The underlying object of the invention is also attained by a dual clutch transmission according to the present invention with preferably only four gear planes, both power take-off gears being shiftably connected to the corresponding countershaft. In the dual clutch transmission, two dual gear planes are provided, one idler gear of the first and second countershafts being associated with a fixed gear of one of the transmission input shafts in every dual gear plane, at least one idler gear in each dual gear plane being used for at least two gears, and two single gear planes being provided, in which one idler gear of the countershafts is associated with a fixed gear of one of the transmission input shafts so that at least one winding path gear can be shifted via at least one shift element K on the second countershaft w_v2, and at least one winding path gear can be shifted with at least one coupling device S_ab1 that is associated with the power take-off gear 12 of the first countershaft w_v1 and is disengaged, and at least one of the coupling devices S_ab2 that is associated with the power take-off gear 13 of the second countershaft w_v2 and is disengaged. When the coupling devices are disengaged, the respective power take-off gears can be detached from the associated countershaft, the coupling devices associated with the power take-off gears being engaged in the non-shifted and/or non-actuated state so that the respective power take-off gear is connected in a rotationally fixed manner to the associated countershaft. Based on the possible multiple uses of idler gears, a maximum number of gear ratios can be implemented with as few gear planes as possible in the proposed dual clutch transmission, all forward gears and reverse gears being preferentially power-shiftable in a sequential manner.

According to another embodiment, this alternative can provide that when the coupling device on the first countershaft is disengaged, the power take-off gear of the first countershaft is decoupled from the first countershaft, so that at least one first forward gear is shiftable as a winding path gear. The power take-off gear can further be decoupled from the second countershaft when the coupling device on the second countershaft is disengaged, so that at least a seventh forward gear can be shifted as a winding path gear. Finally, it is also possible that an idler gear of the second part transmission can additionally be connected to an idler gear of the first part transmission via the shift element on the second countershaft, so that at least one first reverse gear or the like may be shifted as a winding path gear via the activated shift element. In the above embodiment, a crawling gear can additionally be shifted as a winding path gear when the coupling device on the second countershaft is open.

With the dual clutch transmission according to the present invention, winding path gears can be implemented via at least one disengaged coupling device and via at least one engaged shift element, wherein toothed gear wheels of both part transmissions are coupled to one another in order to thus implement a power flow through both part transmissions. The respectively utilized coupling device separates the corresponding power take-off gear from the associated countershaft when the used coupling device is disengaged. Due to both shiftable power take-off gears on each countershaft, on the one hand, more winding path gears can be implemented than when only using one shift element, and on the other hand, the gear shifting can be better adjusted. The employed shift element is used in this case for coupling two idler gears and thus causes the transmission input shafts to interact with one another.

Independently of the respective embodiment of the dual clutch transmission, the arrangement of the shift element for coupling two defined idler gears can be varied so that the shift element does not necessarily have to be arranged between the idler gears to be coupled. Accordingly, other arrangement positions of the shift element are also conceivable, in order to optimize integration in an actuator system.

According to one possible embodiment, in the dual clutch transmission it can be provided that the first gear plane, which is a dual gear plane, comprises a fixed gear on the second transmission input shaft of the second part transmission, and the second gear plane, which is a dual gear plane, as well as the third and fourth gear planes, which are single gear planes, comprise three fixed gears on the first transmission input shaft of the first part transmission. In this context, each of the four fixed gears of the transmission input shaft can be used for at least two gears independently of the respective design. A maximum of four shifting points can preferably be used on each countershaft, such that only a maximum of two actuators are needed for actuating the shifting points. Other embodiments of this are also conceivable. For example, in the arrangement of the different gear steps, it can be provided that the gear steps for the third and fifth power-shifted forward gears are located in one gear plane. In addition, the gear step of the second power-shifted forward gear and of at least one reverse gear can likewise be arranged in one gear plane. In an advantageous manner, only three idler gears are required on one countershaft for the forward gear ratios, the idler gears meshing with the fixed gears of the transmission input shafts, and only two idler gears are required on the other countershaft, which likewise mesh with fixed gears of the transmission input shafts.

In the dual clutch transmission according to the present invention, an intermediate gear, arranged on an intermediate shaft, for example, can be used for implementing reverse gears. It is also possible to use one of the idler gears of a countershaft as an intermediate gear for at least one reverse gear. Thus, an additional intermediate shaft is not necessary for the reverse gear ratio because one of the idler gears meshes both with a fixed gear as well as another shiftable idler gear of the other countershaft. In this way, the intermediate gear required for the reverse gear is arranged as a shiftable idler gear on a countershaft, and is also used for implementing at least one more forward gear. The intermediate gear can always also be configured as a stepped gear, regardless of whether it is arranged on the countershaft or on an additional intermediate shaft.

In order to obtain the desired transmission steps, in the dual clutch transmission according to the present invention it can be provided that at least one double-sided coupling device or the like is arranged as a shifting point on each countershaft. In the activated state, depending on the direction of actuation, the coupling devices can each connect an associated idler gear to the countershaft. In addition, a single-sided coupling device or the like may be can be arranged as a shifting point on at least one of the countershafts. For example, hydraulic, electric, pneumatic, and mechanical clutches or positively locking claw clutches, as well as any type of synchronizing means, can be used as coupling devices for connecting an idler gear to a countershaft in a rotationally fixed manner. It is possible to replace a double-sided coupling device with two single-sided coupling devices and vice versa.

Conceivably the specified arrangement options of the toothed gear wheels can be varied, and the number of toothed gear wheels as well as the number of the coupling devices can be changed in order to implement additional power-shifted and non-power-shifted gears and to achieve savings of installation space and parts in the proposed dual clutch transmission. In particular, fixed gears of dual gear planes can be divided into two fixed gears for two single gear planes. Gear ratio changes can be improved in this way. Apart from that, it is possible to interchange the countershafts. The part transmissions can also be interchanged, i.e. mirrored about a vertical axis. In this way, hollow shaft and solid shafts are swapped. For example, this makes it possible to arrange the smallest gear wheel on the solid shaft in order to further optimize the use of the available installation space. Moreover, adjacent gear planes can be interchanged, for example, in order to optimize a shaft deflection and/or optimally connect a shifting actuation system. In addition, the respective arrangement position of the coupling devices in the gear plane can be varied. Furthermore, the direction of action of the coupling devices can also be varied.

The gear numbers used in the present document have been freely defined. It is also possible to add a crawler in order to improve off-road properties, for example, or the acceleration characteristics of a vehicle. Furthermore, a first gear can be omitted in order to better optimize all step jumps. With these measures, the gear numbers accordingly vary.

Independent of the respective construction variants of the dual clutch transmission, the input shaft and output shaft can preferably be arranged non-coaxially with respect to one another, which implements an especially space-saving arrangement. The shafts, which are thus spatially arranged behind one another, can be minimally offset with respect to one another, for example. With this arrangement, a direct gear with a gear ratio can be implemented by engagement and advantageously shifted relatively freely to fourth, fifth, or sixth gear. Other possible arrangements of the input shaft and of the output shaft are also conceivable.

Preferably the proposed dual clutch transmission is provided with an integrated output step. The output step can comprise a fixed gear on the output shaft as an output gear, which meshes with the first power take-off gear of the first countershaft and with a second power take-off gear of the second countershaft. Depending on the design variant, at least one of the power take-off gears is configured as a gear wheel that can be shifted via a coupling device.

In an advantageous manner, the lower forward gears and reverse gears can be actuated via a starting and/or shift clutch in order to thus concentrate higher loads on this clutch allowing the second clutch to be more efficiently designed in terms of installation space and costs. In the proposed dual clutch transmission, the gear planes can in particular be arranged such that starting is possible via the inner transmission input shaft or via the outer transmission input shaft, and thus via the respectively more suitable clutch, which is also made possible with a concentric, radially nested construction of the dual clutch transmission. In addition, the gear planes can accordingly be arranged and/or interchanged in mirror symmetry. It is also possible that the countershafts are arranged in an interchangeable and/or mirrored manner.

Independently of the respective construction variant, the provided gear planes, for example, can be interchanged in the dual clutch transmission. It is also possible that instead of a dual gear plane, two single gear planes are used, and/or vice versa. In addition, the two part transmissions can be mirrored.

BRIEF DESCRIPTION OF THE DRAWINGS

The present invention will be explained in more detail with reference to the drawings: The drawings show.

DETAILED DESCRIPTION OF THE PREFERRED EMBODIMENTS

FIGS. 1, 3, 5 and 7 each show a possible construction variant of a seven-gear dual clutch transmission. The shift patterns corresponding to each of the construction variants are shown in FIGS. 2, 4, 6 and 8.

Independent of the respective construction variants, the seven-gear dual clutch transmission comprises two clutches K1, K2, whose input sides are connected to an input shaft w_an, and whose output sides are each connected to one of two transmission shafts w_K1, w_K2 that are arranged coaxially to one another. In addition, a torsional vibration damper 14 can be arranged on the input shaft w_an. Two countershafts w_v1, w_v2 are further provided, on which gear wheels are rotatably mounted as idler gears 5, 6, 7, 8, 9, 10. Gear wheels configured as fixed gears 1, 2, 3, 4 are non rotationally fixed on both transmission input shafts w_K1, w_K2, the gear wheels at least partially meshing with the idler gears 5, 6, 7, 8, 9, 10.

Several activatable coupling devices A, B, C, D, E, F are provided on the countershafts w_v1, w_v2 in order to allow the idler gears 5, 6, 7, 8, 9, 10 to be connected to the respective countershaft w_v1, w_v2. Furthermore, power take-off gears 12, 13 are arranged as constant pinion gears on both countershafts w_v1, w_v2, the gears being respectively coupled to a gearing of the output shaft w_ab.

Figure 1:
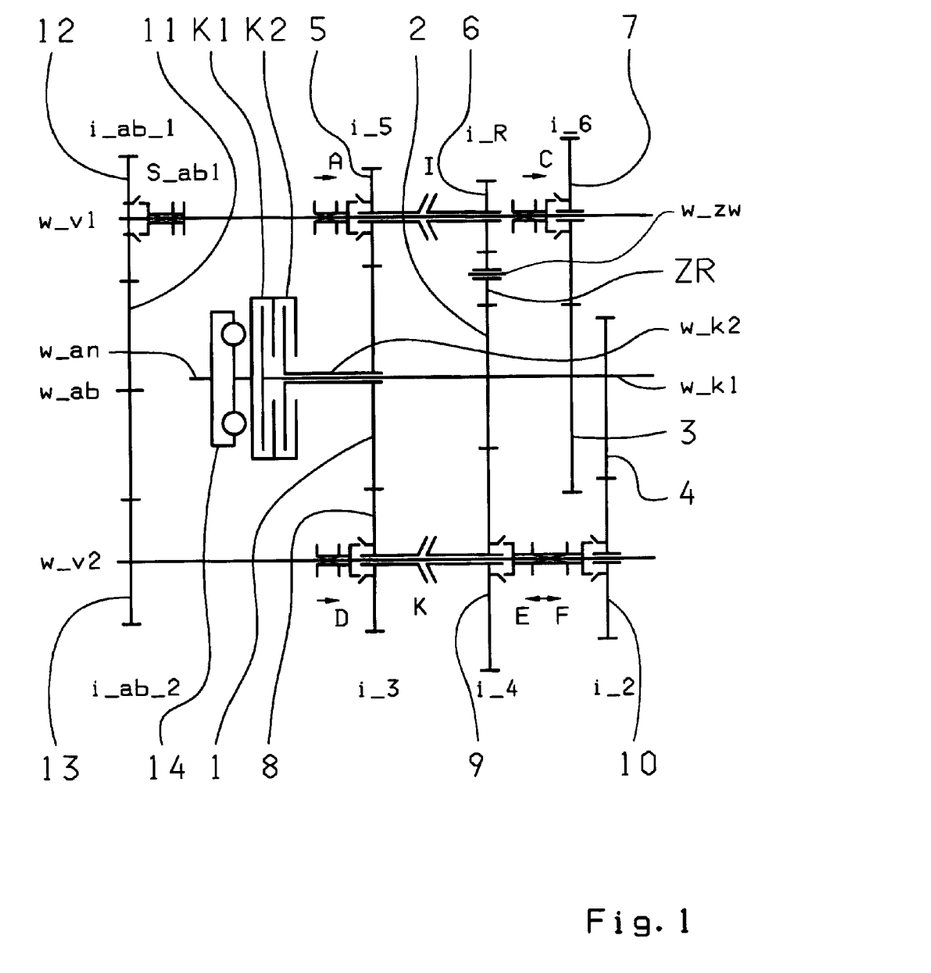
FIG. 1 a schematic view of a first construction variant of a seven-gear dual clutch transmission according to the present invention.
Figure 3:
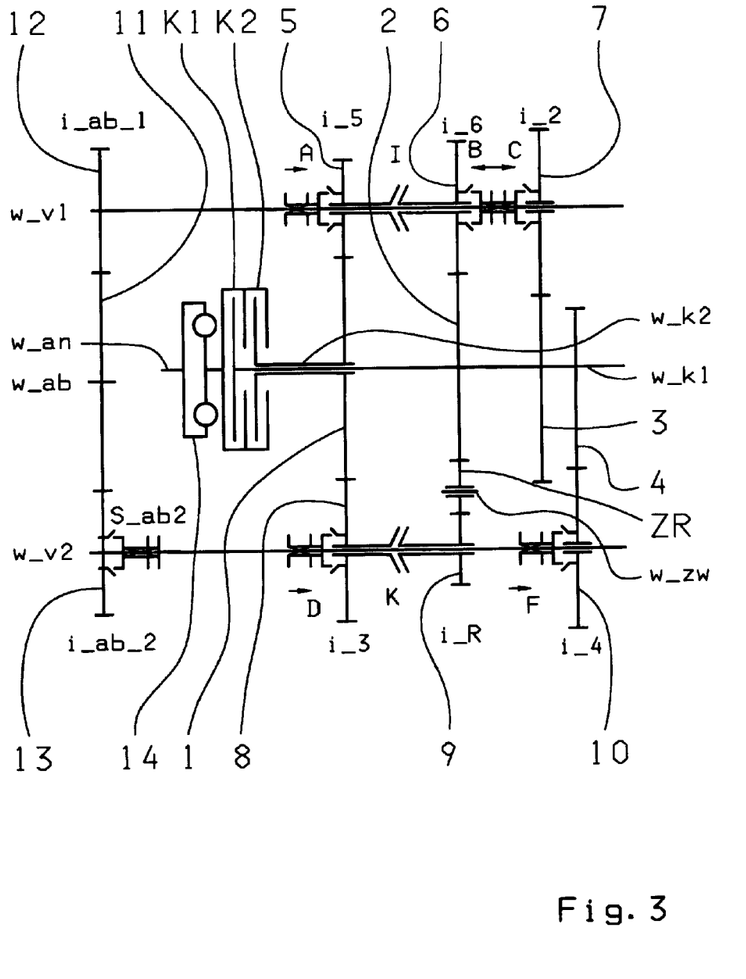
FIG. 3 a schematic view of the second construction variant of a seven-gear dual clutch transmission according to the present invention.
Figure 5:
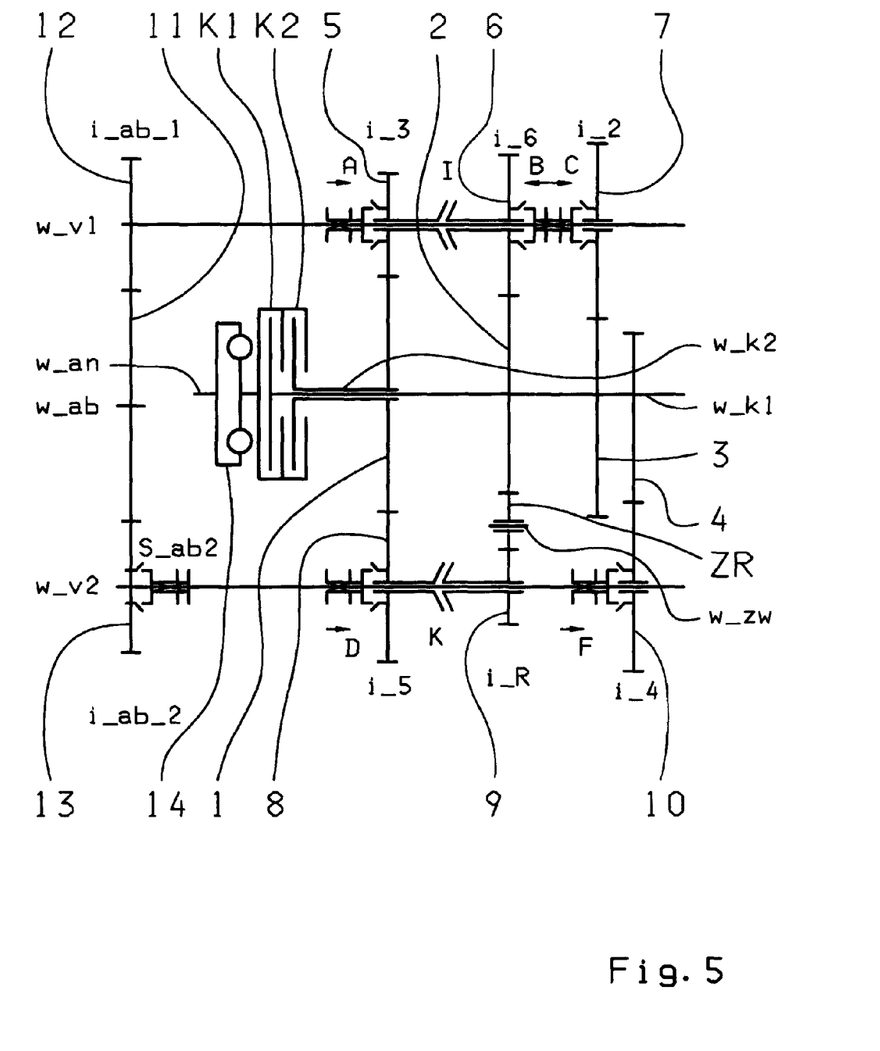
FIG. 5 a schematic view of a third construction variant of the seven-gear dual clutch transmission according to the present invention.

According to the present invention, only four gear planes are thus provided in the dual clutch transmission according to the first, second and third construction variant, two dual gear planes 5-8, 6-9; 5-8, 7-10 are provided and two single gear planes 6-2, 3-9; 7-3, 4-10 are provided in each construction variant, so that at least one winding path gear can be shifted via one shift element K, I on each countershaft w_v1, w_v2, and at least one winding path gear with at least one coupling device S_ab1 that is associated with the output gear wheel 12 of the first countershaft w_v1 and is disengaged.

Accordingly, apart from the coupling devices A, B, C, D, E, F, which form a non-rotatable connection between a toothed gear wheel and the associated countershaft w_v1, w_v2, one activatable shift element I and K is respectively provided on each countershaft w_v1, w_v2, whereby, the shift element I on the first countershaft w_v1, couples the two part transmissions in when activated or engaged state, the idler gear 5 is connected in a rotationally fixed manner to the idler gear 6 of the first countershaft w_v1. The shift element K on the second countershaft w_v2, couples the two part transmissions when in an activated or closed state, the idler gear 8 is connected in a rotationally fixed manner to the idler gear 9 of the second countershaft w_v2. In the first construction variant, according to FIG. 1, a coupling device S_ab1 associated with the power take-off gear 12 is additionally provided, which is respectively disengaged for shifting at least one winding path gear in order to detach the power take-off gear 12 from the first countershaft w_v1. On the other hand, in the second and third construction variants, a coupling device S_ab2 associated with the power take-off gear 13 is provided on the second countershaft w_v2, which is respectively disengaged for shifting at least one winding path gear in order to detach the power take-off gear 13 from the second countershaft w_v2.

In the first construction variant according to FIG. 1, a seventh forward gear G7 as well as a crawling gear C1 is shifted as a winding path gear via the activated and/or engaged shift element K on the second countershaft w_v2, and a reverse gear R1 is shifted via the activated and/or engaged shift element I on the first countershaft w_v1.

In the second and third construction variants, a first forward gear G1 is shifted via the activated and/or engaged shift element I on the first countershaft w_v1, and when the coupling device S_ab2a on the second countershaft w_v2 is activated or engaged, a seventh forward gear G7 as well as a crawling gear C1 are shifted as a winding path gear. A first reverse gear R1 is further shifted as a winding path gear via the engaged and/or activated shift element K on the second countershaft w_v2.

Figure 7:
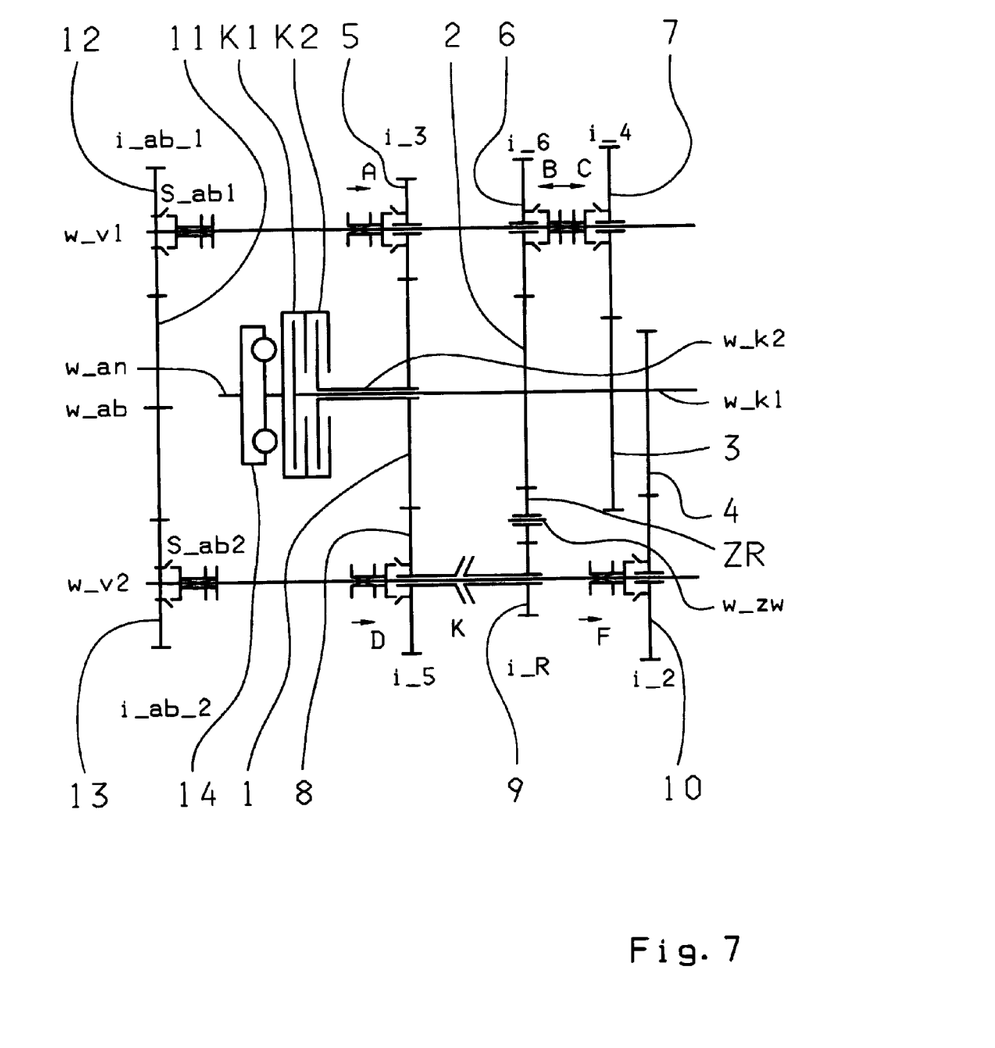
FIG. 7 a schematic view of a fourth construction variant of the seven-gear dual clutch transmission according to the present invention.

According to the present invention, only four gear planes are thus provided in the dual clutch transmission according to the fourth construction variant, two dual gear planes 5-8, 6-9; 5-8, 7-10 being provided in each construction variant, and two single gear planes 6-2, 3-9; 7-3, 4-10 being provided, so that at least one winding path gear can be shifted via one shift element K on the second countershaft w_v2, and at least one winding path gear with at least one coupling device S_ab1 that is associated with the power take-off gear 12 of the first countershaft w_v1 and is disengaged, and with at least one coupling device S_ab2 that is associated with the power take-off gear 13 on the second countershaft w_v2 and is disengaged, can be shifted.

Thus, apart from the coupling devices A, B, C, D, F, which connect a gear wheel and the associated countershaft w_v1, w_v2 in a rotationally fixed manner, a coupling device S_ab1 associated with the output gear wheel 12 is provided on the first countershaft w_v1, which is respectively disengaged for shifting at least one winding path gear in order to detach the power take-off gear 12 from the first countershaft w_v1. In addition, a coupling device S_ab2 is provided on the second countershaft w_v2, which is respectively disengaged for shifting at least one winding path gear in order to detach the power take-off gear 13 from the second countershaft w_v2. Moreover, an activatable shift element K is further provided in the fourth construction variant, the idler gear 8 with the idler gear 9 of the second countershaft w_v2 being non-rotatably connected to the shift element K on the second countershaft w_v2 for coupling both part transmissions in the activated and/or engaged state.

In the fourth construction variant, a first forward gear G1 is shifted as a winding path gear on the first countershaft w_v1 when the coupling device S-ab1 is disengaged and/or activated, and a seventh forward gear G7 as well as a crawling gear C1 are shifted as a winding path gear when the coupling device S_ab2 on the second countershaft w_v2 is disengaged. In addition, a reverse gear R1 is shifted as a winding path gear via the engaged and/or activated shift element K on the second countershaft w_v2.

Independent of the respective construction variant of the dual clutch transmission, the first and the highest forward gears are winding path gears.

According to the first construction variant, in the first gear plane, that being a dual gear plane 5-8, the fixed gear 1 of the second transmission input shaft w_K2 meshes both with the idler gear 5 of the first countershaft w_v1 and with the idler gear 8 of the second countershaft w_v2. In the second gear plane, that being a dual gear plane 6-9, the fixed gear 2 of the first transmission input shaft w_K1 meshes with the idler gear 9 of the second countershaft w_v2. Furthermore, the fixed gear 2 of the first transmission input shaft w_K1 meshes with an intermediate gear ZR, the intermediate gear ZR making it possible to reverse the direction of rotation thus implementing a reverse gear R1, R2. The intermediate gear ZR is rotatably arranged on an intermediate shaft w_zw, the intermediate shaft w_zw being arranged parallel to the countershafts w_v1, w_v2. The intermediate gear ZR in addition meshes with the idler gear 6 of the first countershaft w_v1. In the third gear plane, that being the single gear plane 7-3, the fixed gear 3 of the first transmission input shaft w_K1 meshes with the idler gear 7 of the first countershaft w_v1. Finally, in the fourth gear plane, that being the single gear plane 4-10, the fixed gear 4 of the first transmission input shaft w_K1 meshes with the idler gear 10 of the second countershaft w_v2.

The second, third, and fourth construction variants according to FIGS. 3, 5, and 7 differ only in that the intermediate gear for implementing the reversal of the direction of rotation is configured in the second gear plane as dual gear plane 6-9 between the fixed gear 2 and the idler gear 9.

In all, of the construction variants, a double-sided coupling device B, C; E, F is arranged on each countershaft w_v1, w_v2. In the first construction variant according to FIG. 1, the double-sided coupling device E, F is arranged on the second countershaft w_v2 between the second gear plane, this being dual gear plane 6-9, and the fourth gear plane, this being single gear plane 4-10. In addition, a single-sided coupling device C is associated with the idler gear 7 on the first countershaft w_v1.

In the second, third, and fourth construction variants, the double-sided coupling device B, C is arranged on the first countershaft w_v1 between the second gear plane, this being dual gear plane 6-9, and the third gear plane, this being single gear plane 7-3. In addition, a single-sided coupling device F is associated with the idler gear 10 on the second countershaft w_v2.

Independent of the respective construction variant, two single-sided coupling devices can also be provided for each double-sided coupling device B, C; E, F. By means of the coupling device B, the idler gear 6 can be connected to the first countershaft w_v1, and by means of the coupling device C, the idler gear 7 can be connected to the first countershaft w_v1. By means of the coupling device E, the idler gear 9 can be connected to the second countershaft w_v2, and by means of the coupling device F, the idler gear 10 can be connected to the second countershaft w_v2.

It is provided, moreover, in each construction variant that a one-sided coupling device A is associated with the first gear plane, this being gear plane 5-8, to allow the connection of the idler gear 5 to the first countershaft w_v1. In addition, a one-sided coupling device D is associated with the first gear plane, this being dual gear plane 5-8, for connecting the idler gear 8 to the second countershaft w_v2.

The dual clutch transmission according to the present invention, is provided with an integrated output step with the power take-off gear 12 and with the power take-off gear 13, the power take-off gear 12 and the power take-off gear 13 respectively meshing with a fixed gear 11 of the output shaft w_ab. In the first construction variant, the power take-off gear 12 is shiftably coupled with the first countershaft w_v1 via the coupling device S_ab1, the power take-off gear 13 being connected in a rotationally fixed manner to the second countershaft w_v2. In the second and third construction variants, the power take-off gear 13 is shiftably coupled with the second countershaft w_v2 via the coupling device S_ab2, the power take-off gear 12 being connected in a rotationally fixed manner to the first countershaft w_v1. In the fourth construction variant, both power take-off gears 12 and 13 are each shiftably coupled with the associated countershafts w_v1, w_v2 via the respective coupling devices S_ab1, S_ab2.

Figure 2:
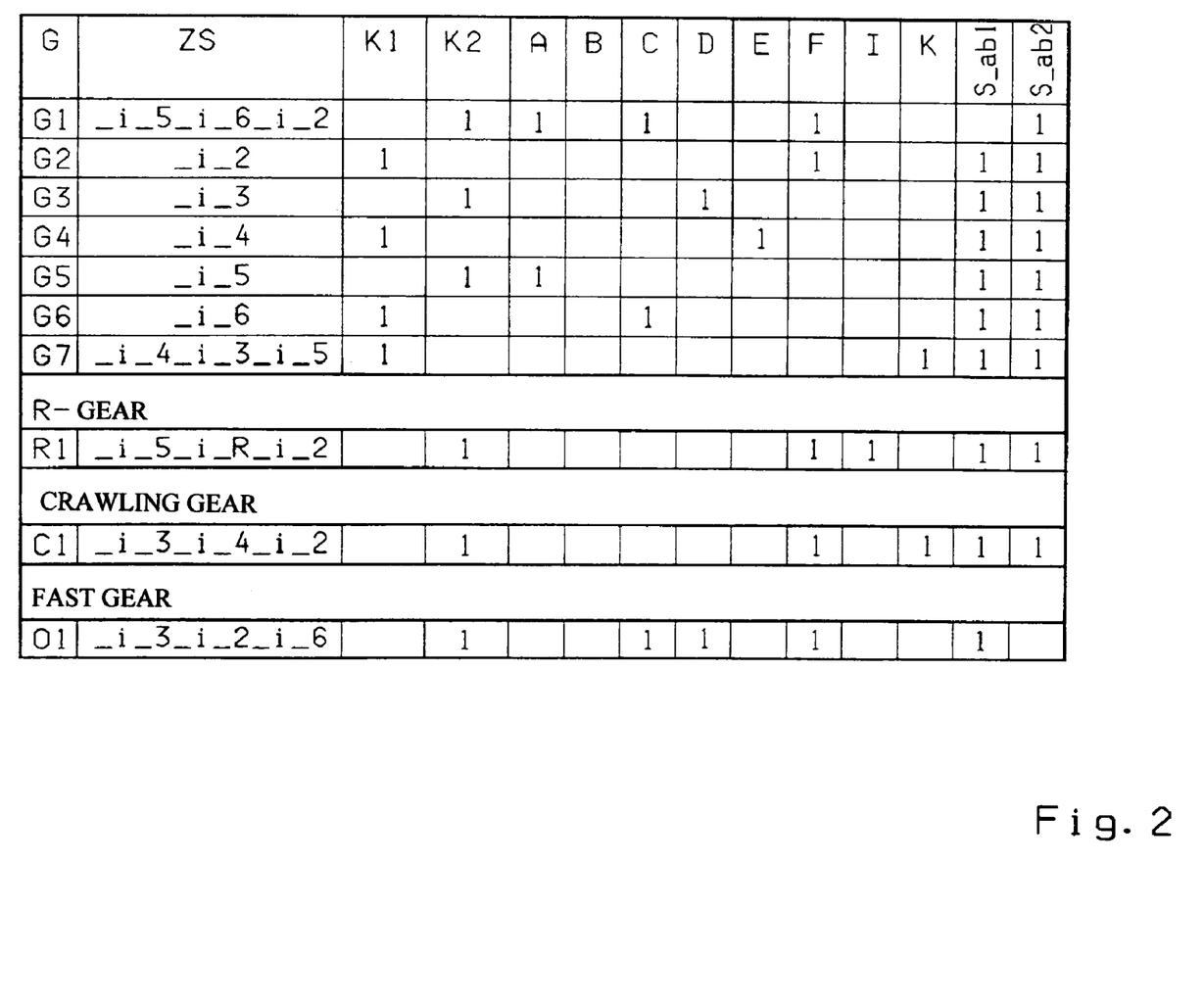
FIG. 2 a shift pattern of the first construction variant according to FIG. 1.

The table of FIG. 2 shows an exemplary shift pattern for the first construction variant of the seven-gear dual clutch transmission according to FIG. 1.

It is apparent from the shift patterns that the first forward gear G1 can be shifted as a winding path gear via the second clutch K2, via the activated coupling device A, via the activated coupling device C, and via the activated coupling device F as well as via the disengaged coupling device S_ab1, the second forward gear G2 can be shifted via the first clutch K1 and via the activated coupling device F, as well as with the engaged coupling device S_ab1, the third forward gear G3 can be shifted via the second clutch K2 and via the activated coupling device D, as well as with the engaged coupling device S_ab1, the fourth forward gear G4 can be shifted via the first clutch K1 and via the activated coupling device E, as well as with the engaged coupling device S_ab1, the fifth forward gear G5 can be shifted via the second clutch K2 and via the activated coupling device A, as well as with the engaged coupling device S_ab1, the sixth forward gear G6 can be shifted via the first clutch K1 and via the activated coupling device C, as well as with the engaged coupling device S_ab1, and the seventh forward gear G7 can be shifted as a winding path gear via the first clutch K1 and the engaged coupling device S_ab1 as well as via the activated shift element K. Furthermore, a reverse gear R1 is shifted as a winding path gear via the second clutch K2 and via the activated coupling device F, the engaged coupling device S_ab1 and the activated shift element I, and a crawling gear C1 is shifted as a winding path gear via the second clutch K2, via the activated coupling device F, the engaged coupling device S_ab1 and via the activated shift element K.

In the first construction variant, if a coupling device S_ab2 is additionally arranged on the second countershaft w_v2, a fast gear O1 can be shifted as a winding path gear via the second clutch K2 and via the activated coupling device C, via the activated coupling device D and via the activated coupling device F, when coupling device S_ab2 is disengaged and the coupling device S_ab1 is closed.

The shift pattern according to FIG. 2 shows in detail that in the first forward gear G1, starting from the second clutch K2, the gear steps i_5, i_6 and i_2 are used, implementing the possibility of coupling both part transmissions when the coupling device S_ab1 is disengaged. In the second forward gear G2, only the gear step i_2 is used. In the third forward gear G3 the gear step i_3, in the fourth forward gear G4 the gear step i_4, in the fifth forward gear G5 the gear step i_5, and in the sixth forward gear G6, the gear step i_6 are used. In the seventh forward gear G7 the gear steps i_4, i_3, and i_5 are used, implementing the possibility of coupling both part transmissions via the engaged shift element K. In the reverse gear R1, the gear steps i_5, i_R, i_2 are used as a winding path gear in the second gear plane, this being the dual gear plane 6-9, implementing the possibility of coupling both part transmissions via the closed shift element I when the coupling device S_ab1 is engaged. In addition, starting from the first clutch K1, the gear steps i_3, i_4, and i_2 are used in a crawling gear C1, implementing the possibility of coupling both part transmissions via the engaged shift element K.

Finally, the gear steps i_3, i_2, and i_6 are used as a winding path gear in a fast gear O1, the coupling device S_ab1 and the coupling device S_ab2 being engaged for coupling both part transmissions.

By arrangement of the gear steps i_2 i_3, and i_4 on the second countershaft w_v2, design advantages in the layout of the gear teeth and with regard to the shaft bearing and shaft layout are obtained in the first construction variant.

Figure 4:
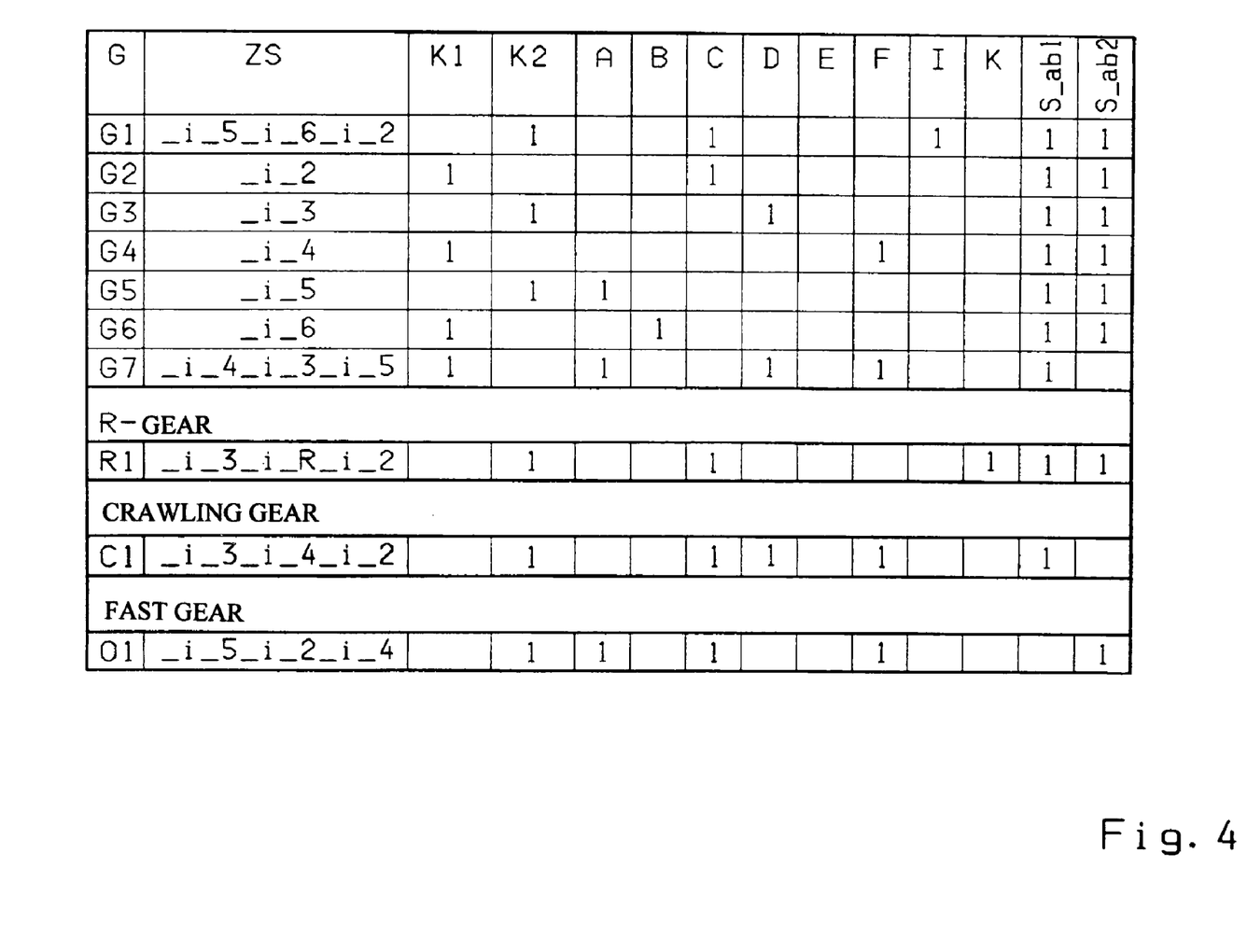
FIG. 4 a shift pattern of the second construction variant according to FIG. 3.

The table in FIG. 4 shows an exemplary shift pattern for the third construction variant of the seven-gear dual clutch transmission according to FIG. 3.

It is apparent from the shift pattern that the first forward gear G1 can be shifted as a winding path gear via the second clutch K2, via the activated coupling device C and via the activated shift element I as well as with the engaged coupling device s_ab2, the second forward gear G2 can be shifted via the first clutch K1 and via the activated coupling device C as well as with the engaged coupling device S_ab2, the third forward gear G3 can be shifted via the second clutch K2 and via the activated coupling device D as well as with the engaged coupling device S_ab2, the fourth forward gear G4 can be shifted via the first clutch K1 and via the activated coupling device F as well as with the engaged coupling device S_ab2, the fifth forward gear G5 can be shifted via the second clutch K2 and via the activated coupling device A as well a with the engaged coupling device S_ab2, the sixth forward gear G6 can be shifted via the first clutch K1 and via the activated coupling device B as well as with the engaged coupling device S_ab2, and the seventh forward gear G7 can be shifted as a winding path gear via the first clutch K1, via the activated coupling device A, via the activated coupling device D, and via the activated coupling device F as well as with the disengaged coupling device S_ab2. Furthermore, a reverse gear R1 can be shifted as a winding path gear via the second clutch K2 and via the activated coupling device C, as well as with the engaged coupling device S_ab2 and engaged shift element K. In addition, a crawling gear C2 can be shifted as a winding path gear via the second clutch K2, via the activated coupling device C, via the activated coupling device D, and via the activated coupling device F as well as via the disengaged coupling device S_ab2.

In the second construction variant, if a coupling device S_ab1 on the first countershaft w_v1 is additionally associated with the power take-off gear 12, a fast gear O1 can be shifted as a winding path gear via the activated coupling device A, via the activated coupling device C, and via the activated coupling device F, when the coupling device S_ab1 is disengaged.

The shift pattern according to FIG. 4 shows in detail that in the first forward gear G1, starting from the second clutch K2, the gear steps i_5, i_6, and i_2 are used, implementing the possibility of coupling both part transmissions via the activated shift element I. In the second forward gear G2, only the gear step i_2 is used. In the third forward gear G3 the gear step i_3, in the fourth forward gear G4 the gear step i_4, in the fifth forward gear G5 the gear step i_5, and in the sixth forward gear G6 the gear step i_6 are used. The gear steps i_4, i_3 and i_5 are used in the seventh forward gear G7, implementing the possibility of coupling both part transmissions via the disengaged coupling device S_ab2. The gear steps i_3, i_R, and i_2 are used as a winding path gear in the reverse gear R1, coupling, both part transmissions being coupled by the engaged shift element K. In addition, starting from the first clutch K2, the gear steps i-3, i_4, and i_2 are used in a crawling gear C1, implementing the possibility of coupling both part transmissions via the disengaged coupling device S_ab2. Finally, the gear steps i_5, i_2, and i_4 are used as a winding path gear in a fast gear O1, the coupling device S_ab1 being disengaged for coupling both part transmissions.

Owing to the fact that the gear steps i_2 and i_4 are each associated with a single gear plane 7-3, 4-10, and that the gear steps i_5, i_6, and i_2 are associated with the first forward gear G1 as a winding path gear, as well as that the gear steps i_4, i_3, and i_5 are associated with the seventh forward gear G7, the dependencies between the gear ratios easily results in geometric gear stepping.

Figure 6:
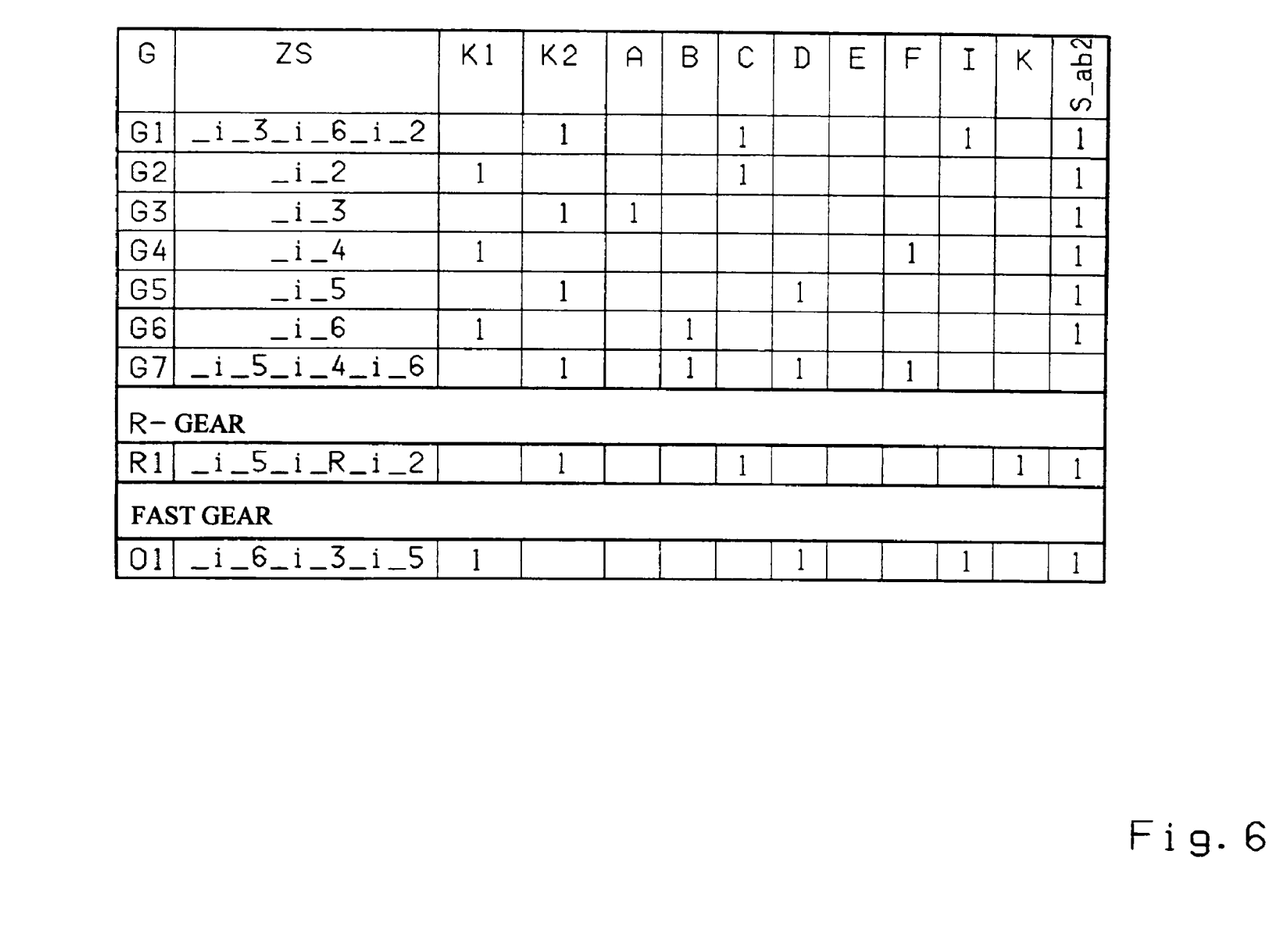
FIG. 6 a shift pattern of the third construction variant according to FIG. 5.

The table in FIG. 6 shows an exemplary shift pattern for the third construction variant of the seven-gear dual clutch transmission according to FIG. 5.

It is apparent from the shift pattern that the first forward gear G1 can be shifted as a winding path gear via the second clutch K2, via the activated coupling device C, and via the engaged shift element I, the second forward gear G2 can be shifted via the first clutch K1 and via the activated coupling device C, as well as with the engaged coupling device S_ab2, the third forward gear G3 can be shifted via the second clutch K2 and via the activated coupling device A, as well as with the engaged coupling device S_ab2, the fourth forward gear G4 can be shifted via the first clutch K1 and via the activated coupling device F, as well as with the engaged coupling device S_ab2, the fifth forward gear G5 can be shifted via the second clutch K2 and via the activated coupling device D, as well as with the engaged coupling device S_ab2, the sixth forward gear G6 can be shifted via the first clutch K1 and via the activated coupling device B, as well as with the engaged coupling device S_ab2, and the seventh forward gear G7 can be shifted as a winding path gear via the second clutch K2, via the activated coupling device B, via the activated coupling device D, and via the activated coupling device F as well as with the disengaged coupling device S_ab2. In addition, a reverse gear R1 can be shifted via the second clutch K2 and via the activated coupling device C, as well as with the engaged coupling device S_ab2. Moreover, a fast gear O1 can be shifted as a winding path gear via the first clutch K1 and via the activated coupling device D, as well as via the engaged shift element I and with the engaged coupling device S_ab2.

The shift pattern according to FIG. 6 shows in detail that in the first forward gear G1, starting from the second clutch K2, the gear steps i_3, i_6, and i_2 are used, implementing the possibility of coupling both part transmissions with the engaged shift element I. In the second forward gear G2, only the gear step i_2 is used. In the third forward gear G3 the gear step i_3, in the fourth forward gear G4 the gear step i_4, in the fifth forward gear G5 the gear step i_5, and in the sixth forward gear G6 the gear step i_6 are used. The gear steps, i_5, i_4, and i_6 are used as a winding path gear in the seventh forward gear G7, implementing the possibility of coupling both part transmissions with the disengaged coupling device S_ab2. The gear steps i_5, i_R, i_2 are used as a winding path gear in the reverse gear R1, shift element K being engaged for coupling both part transmissions. Furthermore, the gear steps i_6, i_3, and i_5 are used as a winding path gear in the fast gear O1, the shift element I being engaged for coupling both part transmissions.

A power-shifted seven-gear transmission is implemented with the fourth construction variant, in which the last gear step can be selected so that plenty of driving power and/or driving torque is available in case of downshifts by the driver.

Figure 8:
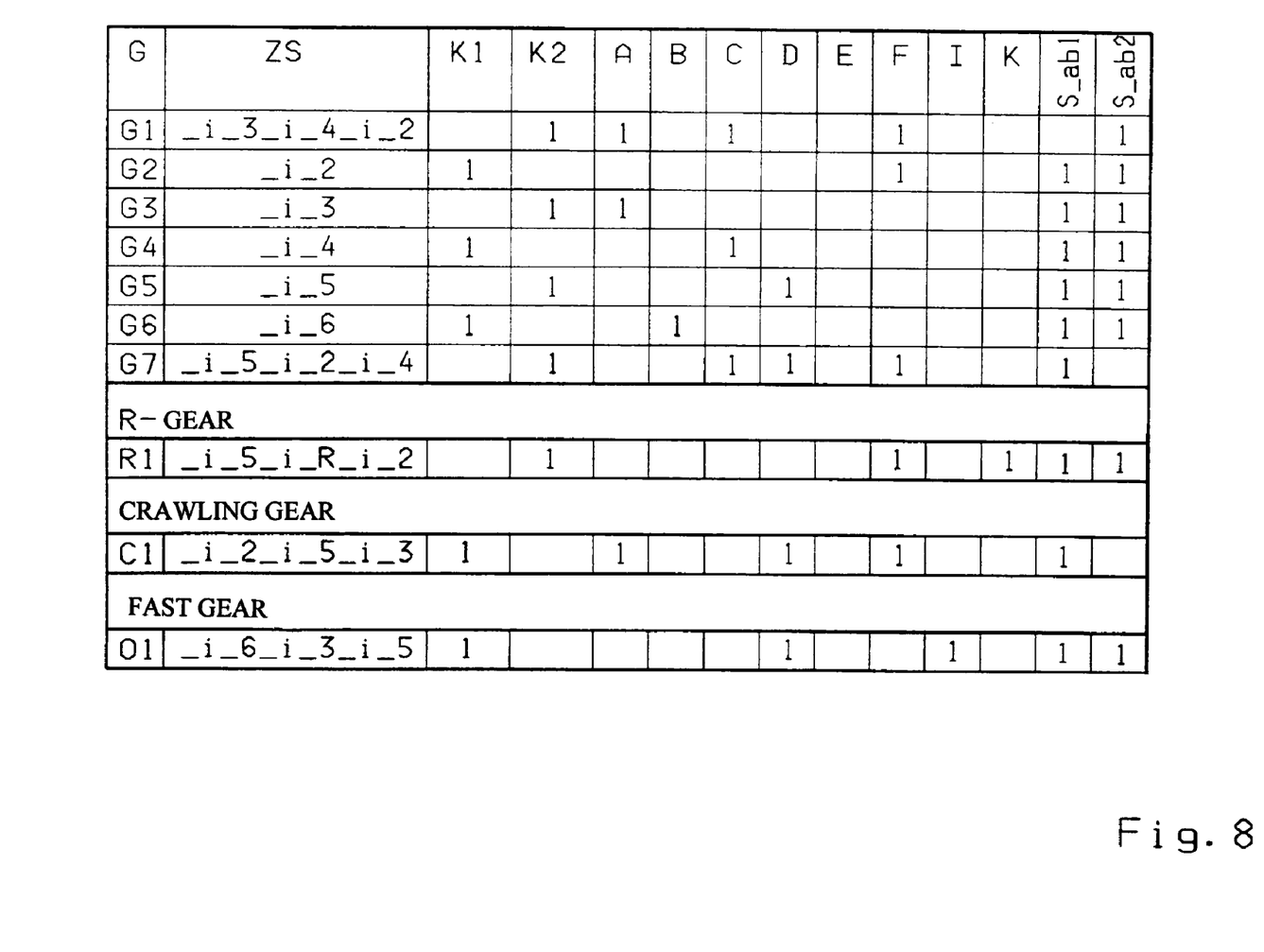
FIG. 8 a shift pattern of the fourth construction variant according to FIG. 7.

The table in FIG. 8 shows an exemplary shift pattern for the fifth construction variant of the seven-gear dual clutch transmission according to FIG. 7.

It is apparent from the shift pattern that the first forward gear G1 can be shifted as a winding path gear via the second clutch K2, via the activated coupling device A, via the activated coupling device C, and via the activated coupling device F, as well as with the engaged coupling device S_ab2 and with the disengaged coupling device S_ab1, the second forward gear G2 can be shifted via the first clutch K1 and via the activated coupling device F, as well as with the engaged coupling device S_ab1 and S_ab2, the third forward gear G3 can be shifted via the second clutch K2 and via the activated coupling device A as well as with the engaged coupling device S_ab1 and S_ab2, the fourth forward gear G4 can be shifted via the first clutch K1 and via the activated coupling device C, as well as with the engaged coupling device S_ab1 and S_ab2, the fifth forward gear G5 can be shifted via the second clutch K2 and via the activated coupling device D, as well as with the engaged coupling device S_ab1 and S_ab2, the sixth forward gear G6 can be shifted via the first clutch K1 and via the activated coupling device B, as well as with the engaged coupling device S_ab1 and S_ab2, and the seventh forward gear G7 can be shifted as a winding path gear via the second clutch K2, via the activated coupling device C, via the activated coupling device D, and via the activated coupling device F, as well as with the disengaged coupling device S_ab2 and engaged coupling device S_ab1. Furthermore, a reverse gear R1 can be shifted as a winding path gear via the second clutch K2 and via the activated coupling device F, as well as via the engaged shift element K and with the engaged coupling device S_ab1 and S_ab2. A crawling gear C1 can be shifted as a winding path gear via the first clutch K1, via the activated coupling device A, via the activated coupling device D, and via the activated coupling device F, as well as via the disengaged coupling device S_ab2 and via the engaged coupling device S_ab1.

In the fourth construction variant, if a shift element I is additionally provided on the first countershaft w_v1, in order to connect the idler gear 5 with the idler gear 6 of the first countershaft w_ab1 in the engaged and/or activated state, a fast gear O1 can be shifted as a winding path gear via the first clutch K1 and via the activated clutch device D, as well as via the engaged coupling device S_ab1 and S_ab2 when the additional shift element I is engaged.

The shift pattern according to FIG. 8 shows in detail that in the first forward gear G1, starting at the second clutch K2, the gear steps i_3, i_4, and i_2 are used, implementing the possibility of coupling both part transmissions with the disengaged coupling device S_ab1. In the second forward gear G2, only the gear step i_2 is used. In the third forward gear G3, the gear step i_3, in the fourth forward gear G4, the gear step i_4, in the fifth forward gear G5 the gear step i_5, and in the sixth forward gear G6 the gear step i_6 are used. The gear steps i_5, i_2, and i_4 are used as a winding path gear in the seventh forward gear G7, implementing the possibility of coupling both part transmissions with the disengaged coupling device S_ab2. The gear steps i_5, i_R, and i_2 are used as a winding path gear in the reverse gear R1, the shift element K being engaged for coupling both part transmissions. Furthermore, the gear steps i_2, i_5, and i_3 are used as a winding path gear in the crawling gear C1, the coupling device S_ab2 being disengaged for coupling both part transmissions. Finally, the gear steps i_6, i_3, and i_5 are used as a winding path gear in the fast gear O1, the coupling shift element I being engaged for coupling both part transmissions.

As in the fourth construction variant, the shift element K and both coupling devices S_ab1 and S_ab2 are available at the power take-off gears 12 and 13, and further winding path gears are available as intermediate, crawling, fast and/or reverse gears without additional construction effort.

In summary, it is apparent from the first construction variant according to FIG. 1 that in the first gear plane as dual gear plane 5-8, the idler gear 5 can be used for three forward gears G1, G5, G7 as well as for one reverse gear G1, and the idler gear 8 can be used for four forward gears G3, G7, C1, O1. On the second gear plane as double gear plane 6-9, the idler gear 9 can be used for one reverse gear R1, and the idler gear 9 can be used for three forward gears G4, G7, C1. In addition, the idler gear 7 can be used for three forward gears G1, G6, O1 in the third gear plane as single gear plane 7-3. Finally, the idler gear 10 can be used for four forward gears G1, G2, C1, O1 and one reverse gear O1 in the fourth gear plane a single gear plane 4-10.

In summary, it is apparent from the second construction variant according to FIG. 3 that in the first gear plane as dual gear plane 5-8, the idler gear 5 can be used for four forward gears G1, G5, G7, O1, and that the idler gear 8 can be used for three forward gears G3, G7, C1 as well as for one reverse gear C1. In the second gear plane as double gear plane 6-9, the idler gear 6 can be used for two forward gears G1, G6, and the idler gear 9 can be used for one reverse gear R1. In addition, the idler gear 7 can be used for four forward gears G1, G2, C1, O1, as well as one reverse gear R1 in the third gear plane a single gear plane 7-3. Finally, the idler gear 10 can be used for four forward gears G4, G7, C1, O1 in the fourth gear plane a single gear plane 4-10.

In summary, it is apparent from the third construction variant according to FIG. 5 that in the first gear plane as dual gear plane 5-8, the idler gear 5 can be used for three forward gears G1, G3, O1, and that the idler gear 8 can be used for three forward gears G6, G7, O1, as well as for one reverse gear C1. In the second gear plane as double gear plane 6-9, the idler gear 6 can be used for four forward gears G1, G6, G7, O1, and the idler gear 9 can be used for one reverse gear R1. In addition, the idler gear 7 can be used for two forward gears G1, G2 as well as for one reverse gear R1 in the third single gear plane as single gear plane 7-3. Finally, the idler gear 10 can be used for two forward gears G4, G7 in the fourth gear plane as single gear plane 4-10.

In summary, it is apparent from the fourth construction variant according to FIG. 7 that in the first gear plane as double gear plane 5-8, the idler gear 5 can be used for four forward gears G1, G3, C1, O1, and that the idler gear 8 can be used for four forward gears G5, G7, C1, O1, as well as for one reverse gear R1. In the second gear plane as double gear plane 6-9, the idler gear 6 can be used for two forward gears G6, O1, and the idler gear 9 can be used for one reverse gear R1. In addition, the idler gear 7 can be used for three forward gears G1, G4, G7 in the third gear plane as single gear plane 7-3. Finally, the idler gear 10 can be used for four forward gears G1, G2, G7, C1 as well as for one reverse gear O1 in the fourth gear plane as single gear plane 4-10.

Because of the provided multiple uses, in all construction variants fewer gear planes and thus fewer components are required for the same number of gears, resulting in advantageous savings in terms of installation space and costs.

Independently of the respective construction variant, the number "1" shown in a field of the respective shift pattern table means that the associated clutch K1, K2 and/or the associated coupling device A, B, C, D, E, F and/or the associated shift element K, I are each engaged. On the other hand, a blank field in the respective shift pattern table means that the associated clutch K1, K2 and/or the associated coupling device A, B, C, D, E, F and/or the associated shift element K, I are each disengaged.

Deviating from the above rules, in the case of the coupling device S_ab1 and/or S_ab2 associated with power take-off gear 12 and/or 13, if a field in the respective shift pattern table is blank, the coupling device S_ab1 and/or S_ab2 has to be disengaged, but if the field shows the number "1," the coupling element S_ab1 and/or S_ab2 has to be engaged, depending on the gear in a first group of gears, and in a second group of gears the coupling element S_ab1 and/or S_ab2 can be disengaged as well as engaged. Furthermore, in many cases it is possible to engage additional coupling or shift elements without affecting the power flow. Gear preselection can thus be made possible.

REFERENCE NUMERALS 1 fixed gear of the second transmission input shaft
2 fixed gear of the first transmission input shaft
3 fixed gear of the first transmission input shaft
4 fixed gear of the first transmission input shaft
5 Idler gear of the first countershaft
6 Idler gear of the first countershaft
7 Idler gear of the first countershaft
8 Idler gear of the second countershaft
9 Idler gear of the second countershaft
10 Idler gear of the second countershaft K1 first clutch
K2 second clutch
w_an input shaft
w_ab output shaft
w_v1 first countershaft
w_v2 second countershaft
A coupling device
B coupling device
C coupling device
D coupling device
E coupling device
F coupling device
i_1 gear step first forward gear
i_2 gear step second forward gear
i_3 gear step third forward gear
i_4 gear step fourth forward gear
i_5 gear step fifth forward gear
i_6 gear step sixth forward gear
G1 first forward gear
G2 second forward gear
G3 third forward gear
G4 fourth forward gear
G5 fifth forward gear
G6 sixth forward gear
G7 seventh forward gear
C1 crawling gear
O1 fast gear
R1 reverse gear
R2 reverse gear
R3 reverse gear
w_zw intermediate shaft
ZR intermediate gear
11 fixed gear of the output shaft
12 power take-off gear of the first countershaft
13 power take-off gear of the second countershaft
14 torsional vibration damper
ZS gear step used
S_ab1 coupling device
S_ab2 coupling device
K shift element
I shift element

The invention claimed is:

1. A dual clutch transmission comprising:
first and second clutches each comprising an input side connected to an input shaft (w_an) and an output side connected to one of first and second transmission input shafts (w_K1, w_K2) coaxially arranged with respect to one another;
at least first and second countershafts (w_v1, w_v2) on which toothed gear wheels configured as idler gears (5, 6, 7, 8, 9, 10) which are rotatably mounted;
toothed gear wheels arranged in a rotationally fixed manner on the transmission input shafts (w_K1, w_K2) and configured as fixed gears (1, 2, 3, 4) at least partially meshing with the idler gears (5, 6, 7, 8, 9, 10);
a plurality of coupling devices (A, B, C, D, E, F) for connecting an idler gear (5, 6, 7, 8, 9, 10) in a rotationally fixed manner to a countershaft (w_v1, w_v2), an output gear (12, 13) being provided on each of the countershafts (w_v1, w_v2), and each of the output gears (12, 13) being coupled to gearing of an output shaft (w_ab);
at least one shift element (K, I), on at least one of the first and the second transmission input shafts (w_K1, w_K2), for connecting two toothed gear wheels in a rotationally fixed manner with one another;
a plurality of power-shifted forward gears (1, 2, 3, 4, 5, 6) and at least one reverse gear (R1, R2, R3) being engagable;
first and second dual gear planes (5-8, 7-10; 5-8, 6-9);
one idler gear (5, 8; 6, 9; 7, 10) of the first and the second countershafts (w_v1, w_v2) being associated with a fixed gear (1, 2, 3, 4) of one of first and the second transmission input shafts (w_K1, w_K2) for each of the first and the second dual gear planes (5-8, 7-10; 5-8, 6-9), and at least one idler gear (5, 6, 7, 8, 9, 10) of each of the two first and the second dual gear planes (5-8, 7-10; 5-8, 6-9) being utilized for implementing at least two gears;
first and second single gear planes (6-2, 3-9; 7-3, 4-10), one idler gear (5, 8; 6, 9; 7, 10) of one of the countershafts (w_v1, w_v2) being associated with a fixed gear (1, 2, 3, 4) of one of the first and the second transmission input shafts (w_K1, w_K2) such that a first at least one shift element winding path gear being shiftable via the at least one shift element (K, I) on at least one of the first and the second countershafts (w_v1, w_v2), and a first at least one coupling device winding path gear being shiftable via at least one coupling device (S_ab1, S_ab2) associated with the output gear (12, 13) of one of the first and the second countershafts (w_v1, w_2) when the at least one coupling device (S_ab1, S_ab2)) is disengaged.

2. The dual clutch transmission according to claim 1, wherein the at least one coupling device (S_ab1) is on the first countershaft (w_v1), a shift element (K, I) is provided on each of the first and the second transmission input shafts (w_K1, w_K2) and when the take off at least one coupling device (S_ab1) on the first countershaft is disengaged, the output gear (12) is decoupled from the first countershaft (w_v1) such that at least one first forward gear (G1) is shifted as the first at least one coupling device winding path gear,
an idler gear (8) of a second part transmission is connected to an idler gear (9) of a first part transmission, via the shift element (K) on the second countershaft (w_v2), such that at least a seventh forward gear (G7) is shifted as the first at least one shift element winding path gear when the shift element (K) on the second countershaft (w_v2) is activated, and
an idler gear (5) of the second part transmission is connected to an idler gear (6) of the first part transmission, via the shift element (I) on the first countershaft (w_v1), such that at least one reverse gear (R1) is shifted as a second at least one shift element winding path gear when the shift element (I) on the first countershaft (w_v1) is activated.

3. The dual clutch transmission according to claim 2, wherein a low speed gear (C1) is shifted as a third at least one shift element winding path gear when the shift element (K) on the second countershaft (w_v2) is activated.

4. The dual clutch transmission according to claim 1, wherein the at least one coupling device (S_ab2) is on the second countershaft (w_v2),
a shift element (K, I) is provided on each of the first and the second transmission input shafts (w_K1, w_K2),
an idler gear (5) of the second part transmission is connected to an idler gear (6) of a first part transmission via the shift element (I) on the first countershaft (w_v1), such that at least one first gear (G1) is shifted via the activated shift element (I) on the first countershaft (w_v1) as the first at least one shift element winding path gear,
the output gear (13) of the second countershaft (w_v2) is disengaged when a take off the at least one coupling device (S_ab2) on the second countershaft (wv2) is disengaged, and at least one seventh forward gear (G7) is shifted as the first at least one coupling device winding path gear, and another idler gear (8) of the second part transmission is connected to another idler gear (9) of the first part transmission, via the engaged shift element (K) of the second countershaft (w_v2), such that at least one first reverse gear (R1) is shifted as a second at least one shift element winding path gear when the shift element (K) on the second countershaft (w_v2) is activated.

5. The dual clutch transmission according to claim 4, wherein a low speed gear (C1) is shifted as a second at least one coupling device winding path gear when the at least one coupling device (s_ab2) on the second countershaft (w_v2) is disengaged.

6. The dual clutch transmission according to claim 1, wherein the first dual gear plane (5-8) is the first gear plane which comprises the fixed gear (1) on the second transmission input shaft (w_K2) of the second part transmission, and the second dual gear plane (6-9) is the second gear plane and the first and second single gear planes (7-3, 4-10) respective form third and fourth gear planes being which comprise three fixed gears (2, 3, 4) on the first transmission input shaft (w_K1) of the first part transmission.

7. The dual clutch transmission according to claim 1, wherein the at least one coupling device (S_ab1) is on the first countershaft (w_v1) and the shift element (K) is located on the second countershaft, a first forward gear (G1) is engaged as the first at least one coupling device winding path gear by engagement of a second clutch (K2), a first coupling device (A), a second coupling device (C) and a fourth coupling device (F) and disengagement of the at least one take-of coupling device (S_ab1) on the first countershaft (w_v), a second forward gear (G2) is engaged by engagement of a first clutch (K1), via the activated fourth coupling device (F), a third forward gear (G3) is engaged by engagement of the second clutch (K2) and a third activated coupling device (D), a fourth forward gear (G4) is engaged by engagement of the first clutch (K1) and a fifth activated coupling device (E), a fifth forward gear (G5) is engaged by engagement of the second clutch (K2) and the first coupling device (A), a sixth forward gear (G6) is engaged by engagement of the first clutch (K1) and the second coupling device (C), and a seventh forward gear (G7) is engaged as the first at least one shift element winding path gear by engagement of the first clutch (K1) and the shift element (K) on the second countershaft.

8. The dual clutch transmission according to claim 7, wherein a shift element (I) is also located on the first countershaft and a reverse gear (R1) is engaged as a second at least one shift element winding path gear by engagement of the second clutch (K2) and the fourth coupling device (F) and engagement of the shift element (I) on the first countershaft.

9. The dual clutch transmission according to claim 7, wherein a low speed gear (C1) is engaged as a third at least one shift element winding path gear by engagement of the second clutch (K2) and the shift element (K) on une of the second countershaft.

10. The dual clutch transmission according to claim 1, wherein the at least one coupling device (S_ab2) is on the second countershaft (w_v2) and the shift element (I) is located on the first countershaft, a first forward gear (G1) is engaged as the first at least one shift element winding path gear by engagement of a second clutch (K2), a second coupling device (C), and a shift element (I) on the first countershaft, a second forward gear (G2) is engaged by engagement of a first clutch (K1) and via the activated second coupling device (C);

a third forward gear (G3) is engaged by engagement of the second clutch (K2) and a third coupling device (D);

a fourth forward gear (G4) is engaged by engagement of the first clutch (K1) and a fourth coupling device (F);

a fifth forward gear (G5) is engaged by engagement of the second clutch (K2) and a first coupling device (A);

a sixth forward gear (G6) is engaged by engagement of the first clutch (K1) and a fifth coupling device (B); and a seventh forward gear (G7) is engaged as the first at least one coupling device winding path gear by engagement of the first clutch (K1), the first coupling device (A), the third coupling device (D) and the fourth coupling device (F) and disengagement of the at least one coupling device (S_ab2) on the second countershaft.

11. The dual clutch transmission according to claim 10, wherein a shift element (k) is also located on the second countershaft a reverse gear (R1) is engaged as a second at least one shift element winding path gear by engagement of the second clutch (K2), the second coupling device (C) and the shift element (K) on the second countershaft.

12. The dual clutch transmission according to claim 10, wherein a low speed gear (C1) is engaged as a second at least one coupling device winding path gear by engagement of the second clutch (K2), the second coupling device (C), the third coupling device (D), and the fourth coupling device (F) and disengagement of the at least one coupling device (S_ab2) on the second countershaft.

13. The dual clutch transmission according to claim 1, wherein the at least one coupling device (S_ab2) is on the second countershaft (w_v2) and the shift element (I) is located on the first countershaft, a first forward gear (G1) is engaged as the first at least one shift element winding path gear by engagement of a second clutch (K2), a second coupling device (C) and the shift element (I) of the first countershaft;

a second forward gear (G2) is engaged by engagement of a first clutch (K1) and a second coupling device (C);

a third forward gear (G3) is engaged by engagement of the second clutch (K2) and is engaged by engagement of a first coupling device (A);

a fourth forward gear (G4) is engaged by engagement of the first clutch (K1) and a fourth coupling device (F);

a fifth forward gear (G5) is engaged by engagement of the second clutch (K2) and a third coupling device (D);

a sixth forward gear (G6) is engaged by engagement of the first clutch (K1) and a fifth coupling device (B); and a seventh forward gear (G7) is engaged as the first at least one coupling device winding path gear by engagement of the second clutch (K2), the fifth coupling device (B), the third coupling device (D), the fourth coupling device (F), and disengagement of the at least one coupling device (S_ab2) on the second countershaft.

14. The dual clutch transmission according to claim 13, wherein a shift element (k) is also located on the second countershaft a reverse gear (R1) is engaged as a second at least one shift element winding path gear by engagement of the second clutch (K2), the second coupling device (C) and the shift element (K) of the second countershaft.

15. The dual clutch transmission according to claim 13, wherein an overdrive (O1) is engaged as a second at least one shift element winding path gear by engagement of the first clutch (K1), the third coupling device (D) and the shift element (I) of the first countershaft.

16. A dual clutch transmission comprising:
first and second clutches (K1, K2) each comprising an input side connected to an input shaft (w_an) and an output side connected to one of first and second transmission input shafts (w_K1, w_K2) coaxially arranged with respect to one another;
at least first and second countershafts (w_v1, w_v2) on which toothed idler gear wheels (5, 6, 7, 8, 9, 10) are rotatably mounted;
at least one toothed gear wheel being arranged in a rotationally fixed manner on both of the first and the second transmission input shafts (w_K1, w_K2) and configured as fixed gear wheels (1, 2, 3, 4), which at least partially mesh with the idler gear wheels (5, 6, 7, 8, 9, 10);
a plurality of coupling devices (A, B, C, D, E, F) for connecting an idler gear wheel (5, 6, 7, 8, 9, 10) in a rotationally fixed manner to one of the first and the second countershaft (w_v1, w_v2), an output gear (12, 13) supported on each of the first and the second countershafts (w_v1, w_v2), each of the output gears (12, 13) being coupled to gearing of an output shaft (w_ab);
at least one shift element (I, K) for connecting two toothed gear wheels in a rotationally fixed manner with one another;
a plurality of power-shifted forward gears (1, 2, 3, 4, 5, 6) and at least one reverse gear (R1, R2, R3) being engagable;
first and second dual gear planes (5-8, 7-10; 5-8, 6-9) each comprising one idler gear wheel (5, 8; 6, 9; 7, 10) of each of the first and the second countershafts (w_v1, w_v2) which are associated with a fixed gear wheel (1, 2, 3, 4) of one of the first and the second transmission input shafts (w_K1, w_K2) in each of the first and the second dual gear planes (5-8, 7-10; 5-8, 6-9), at least one idler gear wheel (5, 6, 7, 8, 9, 10), in each of the first and the second dual gear planes (5-8, 7-10; 5-8, 6-9) being used for implementing at least two gears;
first and second single gear planes (6-2, 3-9; 7-3, 4-10), each comprising one idler gear wheel (5, 8; 6, 9; 7, 10) of each of the first and the second countershafts (w_v1, w_v2) which are associated with a fixed gear wheel (1, 2, 3, 4) of one of the first and the second transmission input shafts (w_K1, w_K2), such that a first at least one shift element winding path gear being shiftable via at least one shift element (K) of the second countershaft (w_v2) and at least first and second coupling device winding path gears are, respectively, shiftable with at least one take off via disengagement of a coupling device (S_ab1) associated with the output gear (12) of the first countershaft (w_v1), and via disengagement of at least one countershaft (w_v2) associated with the output gear (13) of the second countershaft (w_v2).

17. The dual clutch transmission according to claim 16, wherein at least one first forward gear (G1) is shifted as the first coupling device winding path gear by disengagement of the coupling device (S_ab1) associated with the output gear (12) of the first countershaft (w_v) to decouple the output gear (12) of the first countershaft (w_v) from the first countershaft (w_v),
at least a seventh forward gear (G7) is shifted as the second coupling device winding path gear by disengagement of the coupling device (S_abs2) associated with the output gear (13) of the second countershaft (w_v2) to decouple the output gear (13) of the second countershaft (w_v2) from the second countershaft (w_v2), and
at least one reverse gear (R1) is engaged as the first at least one shift element winding path gear by engagement of the shift element (K) of the second countershaft (w_v2) to couple an idler gear (8) of a second part transmission to an idler gear (9) of a first part transmission.

18. The dual clutch transmission according to claim 16, wherein a low speed gear (C1) is engaged as a third coupling device winding path gear by engagement of a first coupling device (A), a fourth coupling device (D) and a fifth coupling device (F) and disengagement of the coupling device (S_ab2) associated with the output gear (13) of the second countershaft (w_v2).

19. The dual clutch transmission according to claim 16, wherein a first dual gear plane (5-8) forms the first gear plane which comprises a fixed gear (1) on the second transmission input shaft (w_K2) of the second part transmission, and the second dual gear plane (6-9) forms a second gear plane and the first and the second single gear planes (7-3, 4-10) respectively form third and fourth gear planes which comprise three fixed gears (2, 3, 4) on the first transmission input shaft (w_K1) of the first part transmission.

20. The dual clutch transmission according to claim 16, wherein:
a first forward gear (G1) is engaged as the first coupling device winding path gear by engagement of the second clutch (K2), a first coupling device (A), a third coupling device (C), a fifth coupling device (F) and disengagement of the take off coupling device (S_ab1) associated with the output gear (12) of the first countershaft (w_v1);
a second forward gear (G2) is engaged by engagement of the first clutch (K1) and the fifth coupling device (F);
a third forward gear (G3) is engaged by engagement of second clutch (K2) and the first coupling device (A);
a fourth forward gear (G4) is engaged by engagement of the first clutch (K1) and the third coupling device (C);
a fifth forward gear (G5) is engaged by engagement of the second clutch (K2) and the fourth coupling device (D);
a sixth forward gear (G6) is engaged by engagement of the first clutch (K1) and a second coupling device (B);
a seventh gear (G7) is engaged the second coupling device winding path gear by engagement of the second clutch (K2), the third coupling device (C), the fourth coupling device (D) and the fifth coupling device (F) and disengagement of the coupling device (S_ab2) associated with the output gear (13) of the second countershaft (w_v2).

21. The dual clutch transmission according to claim 20, wherein a reverse gear (R1) is engaged as the first at least one shift element winding path gear by engagement of the second clutch (K2), the fifth coupling device (F) and the shift element (K) of the second countershaft (w_v2).

22. The dual clutch transmission according to claim 20, wherein a low speed gear (C1) is engaged as a third coupling device winding path gear by engagement of the first clutch (K1), the first coupling device (A), the fourth coupling device (D), the fifth coupling device (F) and disengagement of the coupling device (S_ab2) associated with the output gear (13) of the second countershaft (w_v2).

* * * * *